United States Patent [19]

Oppenheimer

[11] Patent Number: 5,018,253
[45] Date of Patent: May 28, 1991

[54] PILFER-RESISTANT DISPLAY DEVICE

[75] Inventor: Henry W. Oppenheimer, Southampton, N.Y.

[73] Assignee: Ultimate Plastics, Inc., Jamaica, N.Y.

[21] Appl. No.: 307,416

[22] Filed: Feb. 7, 1989

[51] Int. Cl.$^5$ .............................................. A44B 21/00
[52] U.S. Cl. ......................................... 24/458; 24/459; 206/5; 206/478; 206/480; 206/807; 248/902
[58] Field of Search ................................ 211/4, 7, 13; 248/220.4, 221.2, 505, 902, 551, 71; 206/5, 807, 478, 480; 24/16 R, 16 PB, 30.5 R, 30.5 P, 265 AL, 458, 459; 292/318, 246, 320, 295, 67, 307 R; 70/38 A

[56] References Cited

U.S. PATENT DOCUMENTS

| | | | |
|---|---|---|---|
| 1,964,013 | 6/1934 | Wenk | 292/320 |
| 2,779,987 | 2/1957 | Jordan | 24/459 X |
| 3,098,273 | 7/1963 | Cochran | 248/71 |
| 3,848,840 | 11/1974 | Umezu | 248/71 X |
| 4,094,483 | 6/1978 | Busch | 248/220.4 X |
| 4,175,728 | 11/1979 | Ferguson | 24/16 R |
| 4,244,083 | 1/1981 | Aremka | 24/16 R |
| 4,525,904 | 7/1985 | Petri | 24/458 |
| 4,575,038 | 3/1986 | Moore | 248/505 |
| 4,728,068 | 3/1988 | Rivkin | 248/220.4 |
| 4,810,036 | 3/1989 | Buser | 24/265 AL X |

OTHER PUBLICATIONS

Copy of front and backside of a blister pack for a Gerber Cabinet Lock, Item. No. 76186, 1986.

*Primary Examiner*—James R. Brittain
*Attorney, Agent, or Firm*—Kenyon & Kenyon

[57] ABSTRACT

A device for displaying an article comprising a support having first and second apertures, a U-shaped member having first and second legs received in respective ones of said first and second apertures, said legs each having unidirectional teeth disposed thereon for engaging sides of said first and second apertures such that the legs can be translated in the apertures in a first direction to secure the article between the legs by a first force applied in the first direction but cannot be moved in a direction opposite the first direction by an oppositely applied force unless a second force perpendicular to the first force is applied to the legs while applying the force opposite the first force.

11 Claims, 3 Drawing Sheets

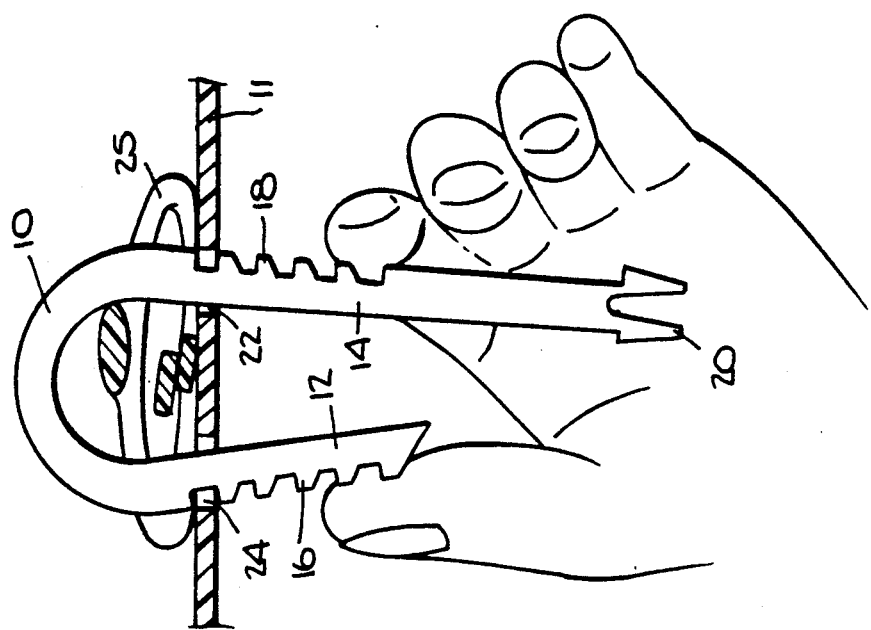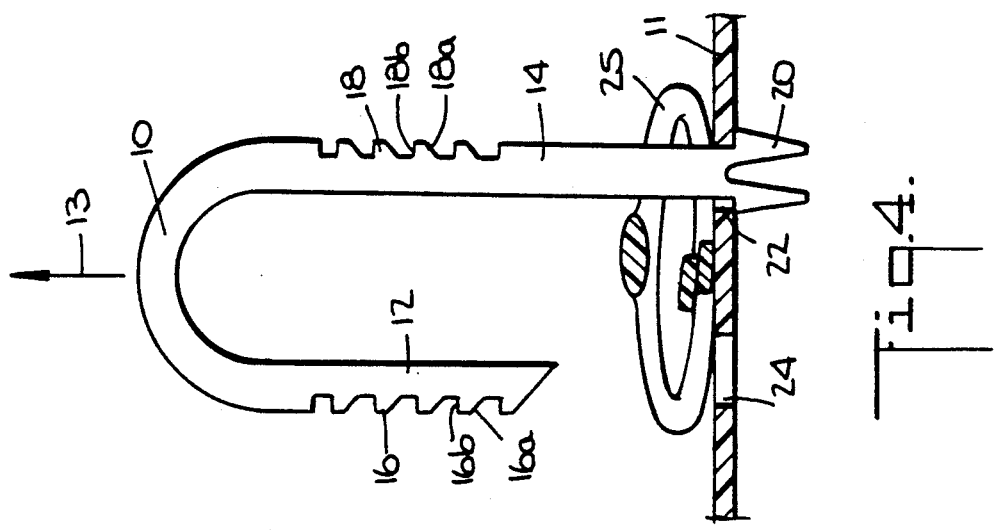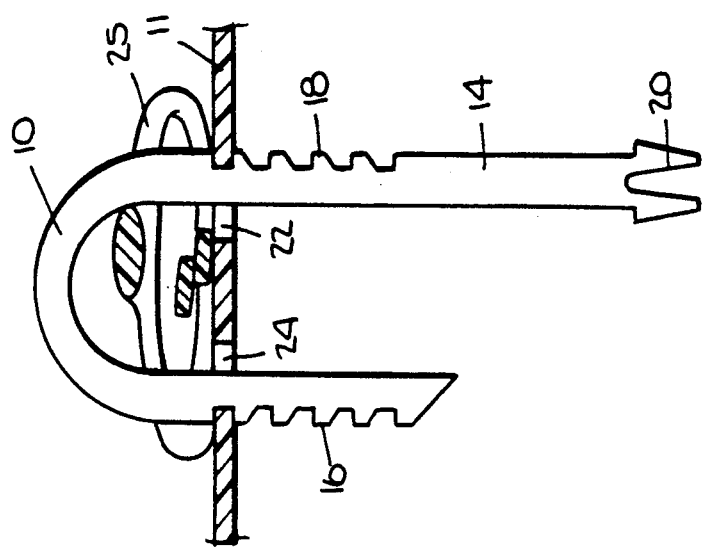

PILFER-RESISTANT DISPLAY DEVICE

BACKGROUND OF THE INVENTION

The present invention relates to display devices, and in particular, to devices for displaying articles for sale or viewing. More particularly, the present invention relates to a display device which provides a pilfer-resistant method of securing the articles displayed, yet allows the articles to be touched.

Many articles displayed for sale or viewing, for example, eyeglasses, are displayed on racks whereby the articles may be easily removed, and thus are subject to theft. There is a need for a means for displaying articles such that the articles may be conveniently removed by persons who are authorized to remove them, but which at the same time prevents unauthorized persons from easily removing the articles. In particular, it is desirable that the articles be easily removed by persons who are authorized to remove them without requiring the inconvenience of utilizing locks and keys to secure the articles, but which at the same time provides a sufficiently pilfer-resistant means of securement.

SUMMARY OF THE INVENTION

It is an object of the present invention to provide a device for securing articles for display purposes.

It is yet still a further object of the present invention to provide such a display device for securing articles which is sufficiently pilfer-resistant to deter unauthorized persons from attempting to remove the articles from the display device.

It is also an object of the present invention to provide such a pilfer-resistant display device which allows persons to touch the articles without having to remove them.

It is another object of the present invention to provide a pilfer-resistant display device where the articles displayed are protected from being mislaid or lost, but which allows the articles to be totally removed if so required.

Another object of the present invention is that it can accommodate various thicknesses of articles to be made pilfer-resistant.

It is furthermore an object of the present invention to provide such a pilfer-resistant display device which is convenient to use by persons who are authorized to remove the articles and which at the same time is not so difficult to use that it becomes an inconvenience to authorized persons.

The above and other objects of the present invention are achieved by a device for displaying an article comprising a support having first and second apertures, a U-shaped member having first and second legs received in respective ones of the first and second apertures, the legs each having unidirectional gripping means disposed thereon for engaging sides of the first and second apertures such that the legs can be translated in the apertures in a first direction to secure the article between the legs by a first force applied in the first direction but cannot be moved in a second direction opposite the first direction by an oppositely applied force unless a second force perpendicular to the first force is applied to the legs while applying the force opposite the first force.

Other objects, features and advantages of the present invention will be apparent from the detailed description which follows.

BRIEF DESCRIPTION OF THE DRAWINGS

The invention will be explained in greater detail in the following detailed description with reference to the drawings in which:

FIG. 2 is a side view, partially in cross-section of the article display device of the present invention shown securing an article.

FIG. 3 shows the article display device according to the present invention when a user is exerting pressure against the legs of the device so as to remove an article secured by the device;

FIG. 4 shows the article display device according to the present invention in such a position that the article can be removed;

DETAILED DESCRIPTION

Figure 1:
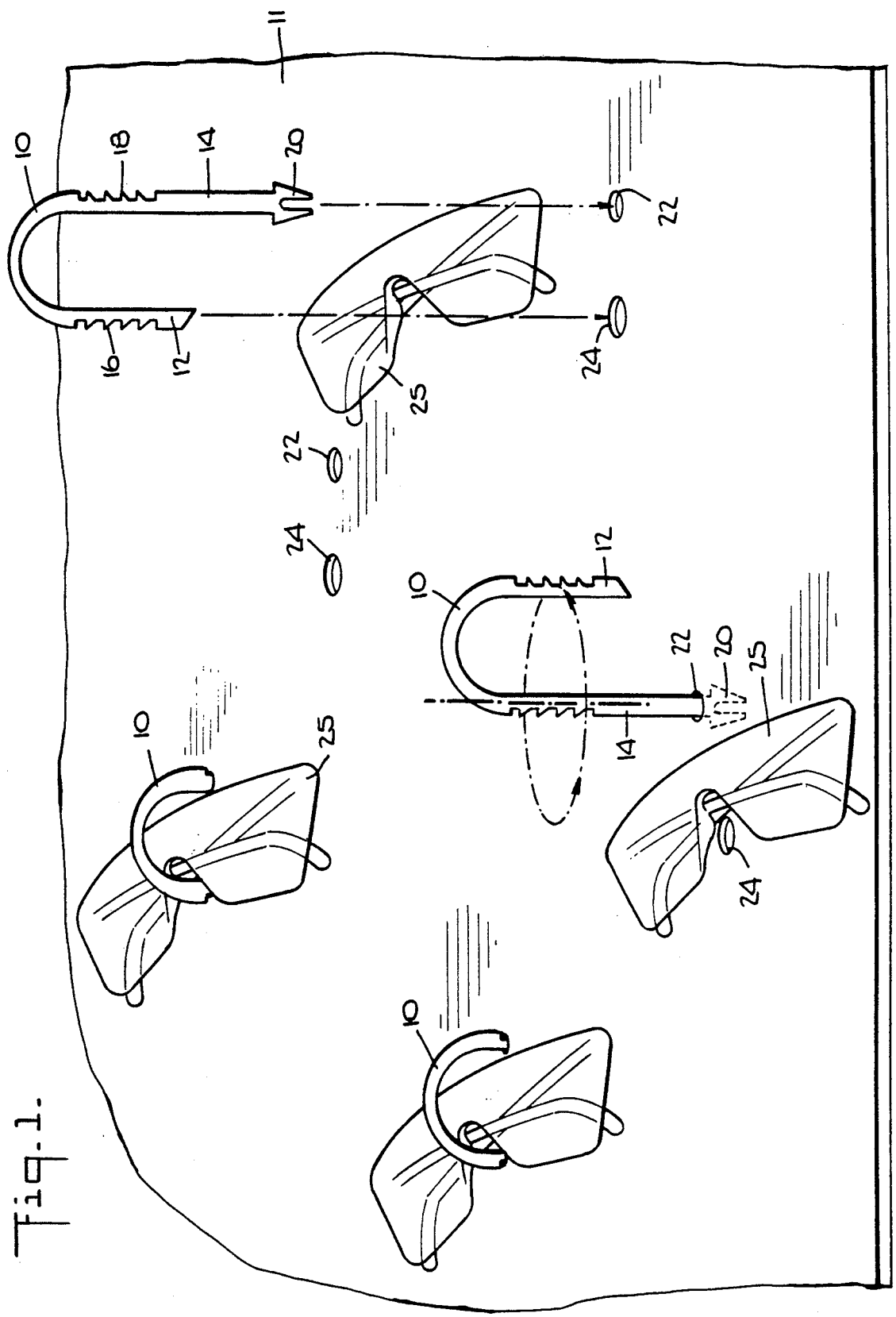
FIG. 1 is a perspective view of the pilfer-resistant article display device according to the present invention.

With reference now to the drawings, FIG. 1 shows generally the article display device of the present invention. With reference also to FIGS. 2 to 4, the device comprises a generally U-shaped member 10 having two depending legs 12 and 14. Depending legs 12 and 14 each have a plurality of one way teeth 16 and 18, respectively, the relevance of which will be explained below. Depending leg 14 is made longer than depending leg 12, and is provided with a deformable head 20, which may be slotted as shown. Slotted head 20 is bevelled so as to be insertable into a first aperture 22 in a sheet of planar material, such as a plastic or wooden display surface, for example, a display panel or hollow wall 11. Panel or wall 11 may be disposed in any suitable orientation, e.g., vertically, horizontally or at any angle, as desired. Leg 12 is insertable into an aperture 24, preferably which is made somewhat larger than aperture 22. A plurality of apertures 22 and 24 may be located on the display panel for receiving a plurality of U-shaped members 10.

As shown in FIG. 1, the display devices according to the present invention may be utilized to secure articles, for example, articles such as eyeglasses 25. However, the display device of the present invention can also be utilized to secure many other types of articles to be displayed as will be evident to persons of skill in the art.

Teeth 16 and 18 provided on legs 12 and 14, respectively, are unidirectional. Thus, by applying a force directed into the panel or wall 11, the legs 12 and 14 may be inserted into the respective apertures 24 and 22. The legs cannot, however, be removed by simply applying a pulling force opposite the force by which the legs were inserted into the apertures in the surface 11. Instead, in order to remove the U-shaped member 10, an additional force, perpendicular to the force directed away from the surface 11, must also be applied to the legs, as discussed below. In order to make teeth 16 and 18 suitably unidirectional, they are formed such that one surface 16a, 18a thereof forms an acute angle with respect to the longitudinal axis of member 10 while the other surface 16b, 18b is formed at substantially a right angle.

Figure 5:
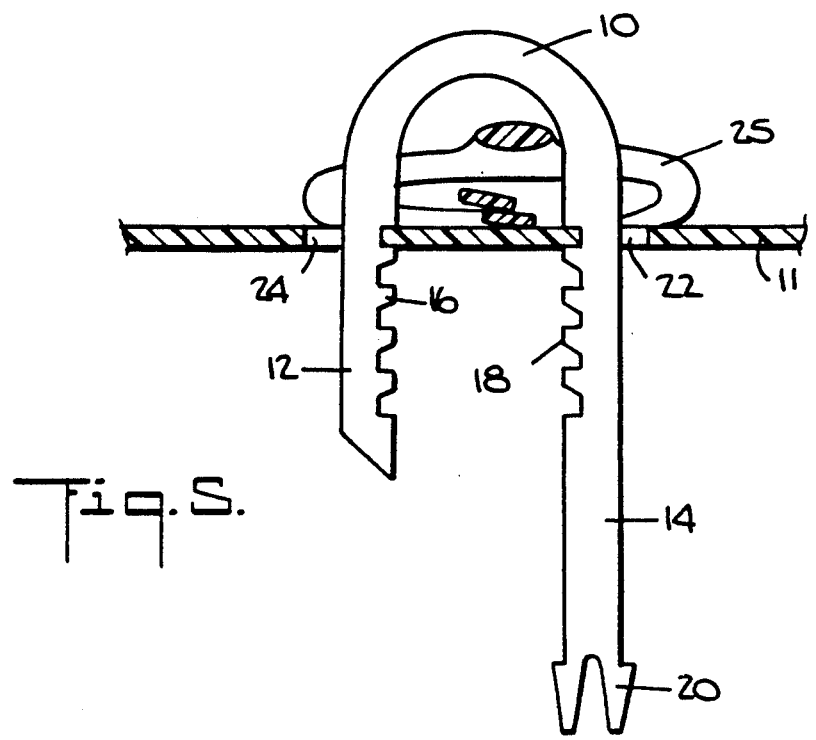
FIG. 5 is a cross-sectional view of another embodiment of the display device according to the present invention.
Figure 6:
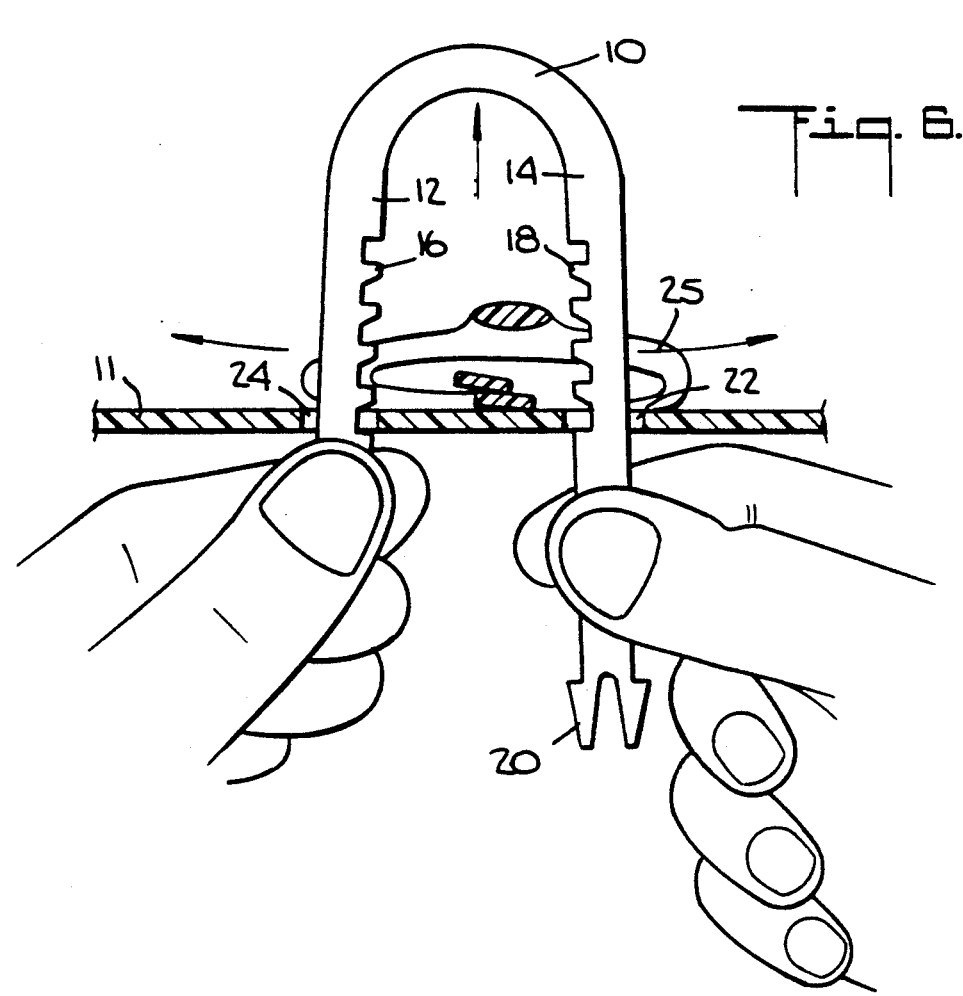
FIG. 6 is a cross-sectional view of the embodiment of FIG. 6 shown prior to removal of the displayed article.

As shown in FIG. 3, in order to remove the article 25, a user may exert pressure from either side of the support panel against the two depending legs 12 and 14. As shown in the embodiment illustrated in FIGS. 2 to 4, the user exerts pressure from behind or in front of surface 11 such as to deform the depending legs such that they are moved toward one another, thus allowing the teeth 16 and 18 to clear the farther sides of the apertures 22 and 24, respectively, as shown specifically in FIG. 3. At the same time, a force is applied in the direction of arrow 13 (FIG. 4) in order to clear the U-shaped member from the article 25 so it can be removed. As will be apparent to a person of skill in the art, the teeth 16 and 18 may also be disposed upon the inner surfaces of legs 12 and 14, i.e., such that the teeth are directed toward each other, in which case, pressure would be exerted by a user such that the two legs are moved away from each other in order to allow the teeth to clear the inner sides of the apertures and thus to remove the article from the display panel. This is shown in FIGS. 5 and 6. In such case, the apertures 22 and 24 are suitably shifted from the positions for the embodiment of FIGS. 2 to 4 so that in the normal position of the U-shaped member 10, the teeth 16 and 18 engage the sides of the apertures 24 and 22 which are closest to each other and such that when pressure is exerted forcing the legs 12 and 14 away from each other, the teeth 16 and 18, respectively, clear the side surfaces of the apertures 24 and 22. See FIG. 6.

Aperture 22 is preferably made smaller than aperture 24 so that the head end 20 of the leg 14 is not easily removable from the aperture 22 and thus stays in position on the display panel once the article 25 has been removed.

As shown in FIG. 4, an upward movement in the direction of arrow 13 of the U-shaped member 10 will clear the leg 12 from the display panel aperture 22, thus allowing the article 25 to be removed. As shown in FIG. 1, the U-shaped member 10 can be rotated on leg 14 as shown by arrows 26 so that it is clear of the article 25. In order to remove member 10 from the surface 11, head 20 must be pinched, thus allowing the head to clear the aperture 24. Head 20 may be provided with a bevelled surface so it is conical in cross-section as shown.

There has thus been described an article display device which is pilfer-resistant. It is pilfer-resistant because the appropriate forces discussed must be applied to the legs 12 and 14 in order to remove the member 10 from the support panel in order to free the article being displayed. A person unfamiliar with the display device will not be able to perform the necessary operations quickly or easily. However, an authorized person who is familiar with the operation of the display device will easily be able to deform the legs 12 and 14 from the front or rear of the support panel such that the U-shaped member 10 can be moved away from the panel 11 and thus be cleared of the article 25 being held between the legs 12 and 14 of the U-shaped member. Although the drawings only show the forces being applied to the legs 12 and 14 from the rear of the support panel 11, such forces can also be applied from in front of the support panel.

As indicated above, the article display device according to the present invention is not limited to any particular article for display. The illustrative embodiment shows the article display device securing eyeglasses, but it is applicable to many other devices as will be apparent to a person of skill in the art. Also, the device of the present invention and, in particular U-shaped member 10, can be made of a number of substances, for example, plastic, wood or even a readily deformable spring metal. Other materials can also be used as will be apparent to a person of skill in the art.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A device for displaying an article comprising:
a support having first and second apertures, said first aperture being smaller than said second aperture;
a U-shaped member having first and second legs received in respective ones of said first and second apertures, said legs each having unidirectional gripping means disposed thereon for engaging sides of said first and second apertures such that said legs can be translated in said apertures in a first direction to secure said article between said legs by a first force applied in the first direction but cannot be moved in a second direction opposite said first direction by an oppositely applied force unless a second force perpendicular to said first force is applied to said legs to bend said legs while applying the force opposite the first force, the first leg being longer than the second leg, said first leg having a deformable head end receivable through the first of said apertures whereby said first leg can be pivoted in the first aperture when said second leg is not received in the second aperture, thereby facilitating placement and removal of the article to be displayed, said deformable head of said first leg being sized such that in its undeformed state, said head has a width greater than the first aperture.

2. The display device recited in claim 1, wherein said unidirectional gripping means comprise a plurality of teeth on each of said legs.

3. The display device recited in claim 2, wherein said teeth are provided on outer sides of said legs directed away from each other.

4. The display device recited in claim 3, wherein said second force is directed so as to deform said two legs such that said two legs are moved toward each other, thus allowing said teeth to clear sides of said two apertures.

5. The display device recited in claim 2, wherein said teeth are disposed facing each other on said two legs and said second force is directed so as to deform said two legs such that said two legs are moved away from each other, thus allowing said teeth to clear sides of said two apertures.

6. The display device recited in claim 2, wherein said teeth are formed such that one surface of said teeth has an angle of less than 90° with respect to a longitudinal axis of said U-shaped member and another surface has an angel of substantially 90° with respect to said longitudinal axis.

7. The display device recited in claim 1, wherein said head end is larger than said first aperture but is deformable such that it can be received in said first aperture by application of said first force in the direction of said first leg but cannot be removed easily by a force opposite said first force.

8. The display device recited in claim 7, wherein said first leg can be removed from said first aperture by deforming said head end.

9. The display device recited in claim 8, wherein said deformable head end comprises a conically-shaped member having a longitudinal slot.

10. The display device recited in claim 1, wherein said second force is directed so as to deform said two legs whereby said second force is applied from behind said support.

11. The display device recited in claim 1, wherein said second force is directed so as to deform said two legs such that said second force is applied from in front of said support.

* * * * *